(12) United States Patent
Lin

(10) Patent No.: US 11,609,452 B2
(45) Date of Patent: Mar. 21, 2023

(54) DIRECT-TYPE BACKLIGHT MODULE AND DISPLAY

(71) Applicant: SHENZHEN TCL NEW TECHNOLOGY CO., LTD., Shenzhen (CN)

(72) Inventor: Yifeng Lin, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/258,897

(22) PCT Filed: Dec. 25, 2019

(86) PCT No.: PCT/CN2019/128106
§ 371 (c)(1),
(2) Date: Jan. 8, 2021

(87) PCT Pub. No.: WO2020/135459
PCT Pub. Date: Jul. 2, 2020

(65) Prior Publication Data
US 2021/0294159 A1 Sep. 23, 2021

(30) Foreign Application Priority Data
Dec. 27, 2018 (CN) .......................... 201822219048.8

(51) Int. Cl.
*G02F 1/13357* (2006.01)
*G02F 1/1333* (2006.01)

(52) U.S. Cl.
CPC .. *G02F 1/133603* (2013.01); *G02F 1/133385* (2013.01); *G02F 1/133606* (2013.01); *G02F 1/133608* (2013.01)

(58) Field of Classification Search
None
See application file for complete search history.

(56) References Cited

U.S. PATENT DOCUMENTS

2009/0268434 A1 10/2009 Mita et al.
2016/0004007 A1* 1/2016 Chen ..................... G02F 1/1336
362/606

(Continued)

FOREIGN PATENT DOCUMENTS

CN 102818193 A * 12/2012
CN 102818193 A 12/2012

(Continued)

OTHER PUBLICATIONS

The World Intellectual Property Organization (WIPO) International Search Report for PCT/CN2019/128106 Mar. 27, 2020 8 Pages (including translation).

(Continued)

*Primary Examiner* — Britt D Hanley
(74) *Attorney, Agent, or Firm* — Nathan & Associates; Menachem Nathan

(57) ABSTRACT

A direct-type backlight module and a display are provided. The direct-type backlight module includes: a back plate, an optical assembly, and a middle frame arranged on a front face of the back plate and located at a periphery of the optical assembly. The direct-type backlight module further includes: a thermally conductive pad and a Mini LED lamp panel arranged between the back plate and the optical assembly; and a plurality of core modules disposed at a back of the back plate, wherein the back plate has a plurality of pillars arranged, and the pillars separate the core modules from the back plate.

16 Claims, 5 Drawing Sheets

(56) References Cited

U.S. PATENT DOCUMENTS

2017/0227704 A1\* 8/2017 Li ..................... G02B 6/0093
2019/0182981 A1\* 6/2019 Huang ............... H05K 7/20145
2020/0320939 A1\* 10/2020 Ma .................... G02F 1/133603

FOREIGN PATENT DOCUMENTS

| CN | 204964946 U | \* | 1/2016 | |
|----|-------------|---|--------|---|
| CN | 204964946 U | | 1/2016 | |
| CN | 108287436 A | | 7/2018 | |
| CN | 108445675 A | | 8/2018 | |
| CN | 108681118 A | \* | 10/2018 | ....... G02F 1/133603 |
| CN | 108681118 A | | 10/2018 | |
| CN | 108717242 A | | 10/2018 | |
| CN | 108732817 A | | 11/2018 | |
| CN | 108803149 A | | 11/2018 | |
| CN | 108983497 A | | 12/2018 | |
| CN | 209215812 U | | 8/2019 | |
| JP | 2018163315 A | | 10/2018 | |

OTHER PUBLICATIONS

The Extended European Search Report dated Feb. 4, 2022 From the European Patent Office Re. Application No. EP19903736.7.

\* cited by examiner

Appendix

DIRECT-TYPE BACKLIGHT MODULE AND DISPLAY

CROSS-REFERENCES TO RELATED APPLICATIONS

This application is a national stage application of PCT Patent Application No. PCT/CN2019/128106, filed on Dec. 25, 2019, which claims priority to Chinese Patent Application No. 201822219048.8, filed on Dec. 27, 2018, the content of all of which is incorporated herein by reference.

FIELD OF THE INVENTION

The present disclosure relates to the technical field of backlight module, and, more particularly, to a direct-type backlight module and a display.

BACKGROUND

An LED TV is getting thinner and thinner, especially for a direct-type TV. However, it is a big challenge in both a structure and an optic to make a direct-type TV ultra-thin. In the prior art, as shown in FIG. 1, a light source 4 is arranged on a back plate 1, and a liquid crystal display (LCD) screen 5 is arranged on a front face of an optical assembly 3. In the prior art, the direct-type TV in a whole could only get thinned on a periphery (a middle frame 2), while an area in a large-scale as a whole is still pretty thick, due to there is a certain gap required in an optical design from the light source 4 to a lower surface of the optical assembly 3, which is called an OD value (i.e., d). A function of the gap is allowing a light from the light source 4 to be evenly refracted or reflected to the optical assembly 3, thus it is difficult to achieve a design of ultra-thin in a large-scale for the above reason.

Therefore, the current technology needs to be improved and developed.

BRIEF SUMMARY OF THE DISCLOSURE

According to the above described defects, the purpose of the present disclosure is providing a direct-type backlight module and a display, in order to solve a problem that a direct-type backlight module in the prior art is difficult to achieve ultrathin in a large scale due to the OD value.

A technical solution of the present disclosure to solve the technical problems is as follows:

A direct-type backlight module, comprising a back plate, an optical assembly, and a middle frame arranged on a front face of the back plate and located at a periphery of the optical assembly, wherein further comprising: a thermally conductive pad and a Mini LED lamp panel arranged between the back plate and the optical assembly; the thermally conductive pad connects to the back plate, the Mini LED lamp panel connects to the thermally conductive pad, and the optical assembly connects to the middle frame while contacting with the Mini LED lamp panel.

The direct-type backlight module, wherein the Mini LED lamp panel comprising: a mounting board and a plurality of Mini LED lamps; the Mini LED lamps are arranged on a side of the mounting board facing the optical assembly.

The direct-type backlight module, wherein a side of the mounting board facing the thermally conductive pad has a plurality of sockets arranged, the thermally conductive pad has a socket hole arranged for the sockets to pass through.

The direct-type backlight module, wherein the mounting board and the thermally conductive pad are connected by a thermal conductive glue.

The direct-type backlight module, wherein a top surface of the optical assembly has a plurality of hanging parts arranged, and the middle frame has a plurality of tabs adapting to the hanging parts arranged.

The direct-type backlight module, wherein the optical assembly comprises a diffuser plate and an optical film; the diffuser plate is in direct contact with the Mini LED lamp panel, and the optical film connects to the hanging part.

The direct-type backlight module, wherein a bottom of a back surface of the back plate has a reinforcement beam arranged, and the reinforcement beam comprises: two cross beams and a plurality of longitudinal beams connecting to the two cross beams.

A display, wherein comprising a direct-type backlight module and an LCD screen, the direct-type backlight module comprises a back plate, an optical assembly, and a middle frame arranged on a front face of the back plate and located at a periphery of the optical assembly, wherein further comprising: a thermally conductive pad and a Mini LED lamp panel arranged between the back plate and the optical assembly; the thermally conductive pad connects to the back plate, the Mini LED lamp panel connects to the thermally conductive pad, and the optical assembly connects to the middle frame while contacting the Mini LED lamp panel.

The display, wherein the Mini LED lamp panel comprising: a mounting board and a plurality of Mini LED lamps, the Mini LED lamps are arranged in a matrix on a side of the mounting board facing the optical assembly.

The display, wherein the mounting board and the thermally conductive pad are connected by a thermal conductive glue.

The display, wherein a side of the mounting board facing the thermally conductive pad has a plurality of sockets arranged, the thermally conductive pad has a socket hole for the sockets to pass through.

The display, wherein a top surface of the optical assembly has a plurality of hanging parts arranged, and the middle frame has a plurality of tabs adapting to the hanging parts arranged.

The display, wherein the optical assembly comprises a diffuser plate and an optical film; the diffuser plate is in direct contact with the Mini LED lamp panel, and the optical film connects to the hanging parts.

The display, wherein a back of the back plate has a plurality of core modules and a back shell arranged, the core modules locate in the back shell; the back plate has a plurality of pillars arranged, the pillars separate the core modules from the back plate.

The display, wherein a bottom of a back surface of the back plate has a reinforcement beam arranged, and the reinforcement beam comprises: two cross beams and a plurality of longitudinal beams connecting to the two cross beams.

The display, wherein the core modules connect electronically to the Mini LED lamps through the sockets; the back plate has a wiring hole arranged, and a plurality of wires connecting to the core modules may pass through the wiring hole and the socket hole in turn before connecting to the sockets.

The display, wherein the middle frame has an LCD screen arranged, and the LCD screen locates on a side of the optical assembly away from the back plate.

The display, wherein the middle frame comprises: an upper middle frame, a lower middle frame, a left middle frame, a right middle frame, a rear pressing plate and a front pressing plate.

The display, wherein a top edge, a left edge, and a right edge of the LCD screen are connected to the upper middle frame, the left middle frame, and the right middle frame respectively.

The display, wherein a bottom edge of the LCD screen is fixed between the rear pressing plate and the front pressing plate.

Benefits: due to adopting the Mini LED lamp panel, the Mini LED lamp panel may contact with the optical assembly, having an OD value of zero, the light emitted by the Mini LED lamp panel may irradiate evenly on the optical assembly, making a thickness of the direct-type backlight module get greatly reduced.

DETAILED DESCRIPTION OF EMBODIMENTS

The present disclosure provides a direct-type backlight module and a display, in order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Referencing from FIG. 2 to FIG. 9 at a same time, the present disclosure provides a plurality of embodiments on the direct-type backlight module.

Figure 2:
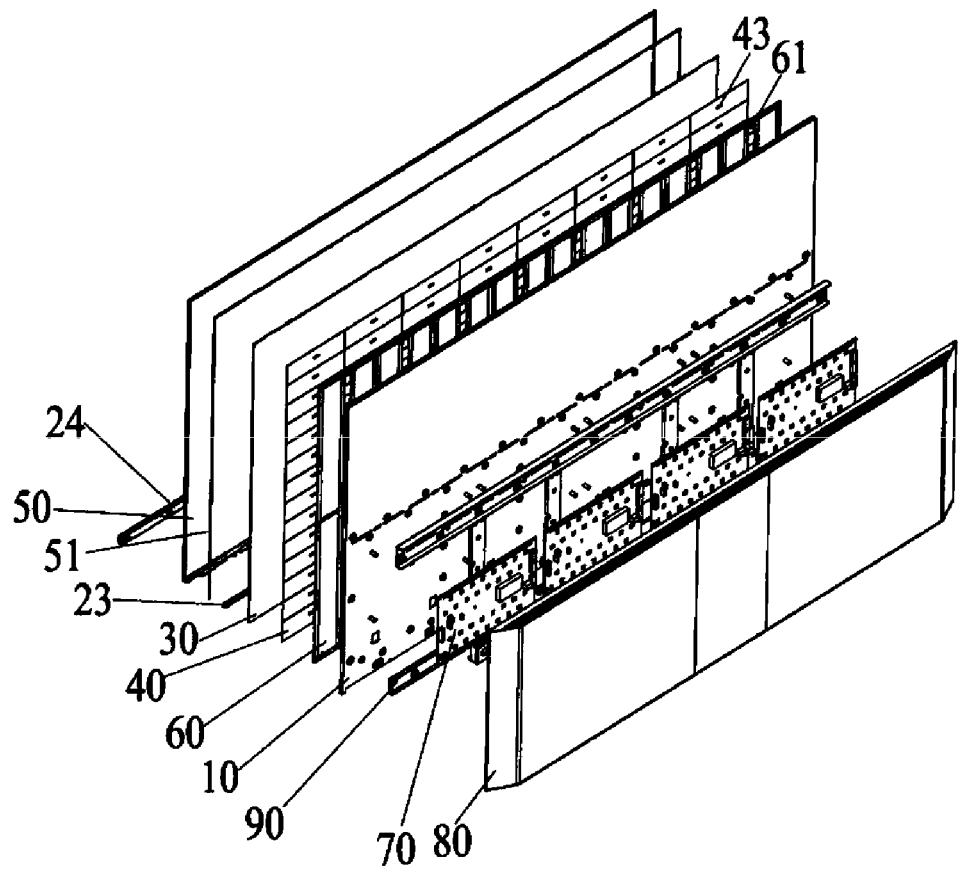
FIG. 2 illustrates an exploded diagram of the direct-type backlight module in the present disclosure.
Figure 3:
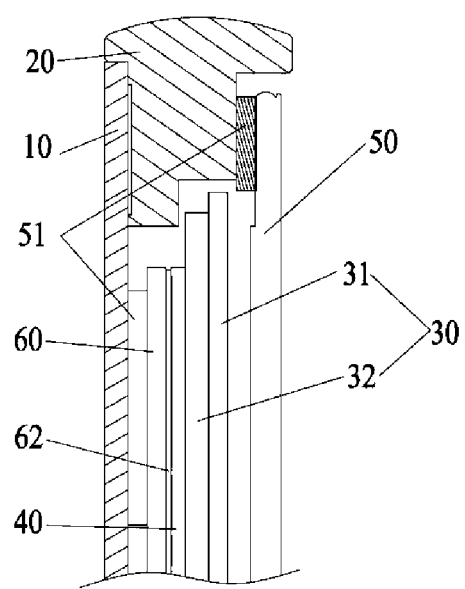
FIG. 3 illustrates a first cross-sectional diagram of the direct-type backlight module in the present disclosure.

Shown as FIG. 2 and FIG. 3, the direct-type backlight module comprises: a back plate 10, an optical assembly 30, a middle frame 20 arranged on a front face of the back plate 10 and located at a periphery of the optical assembly 30, as well as a thermally conductive pad 60 and a Mini LED lamp panel 40 arranged between the back plate 10 and the optical assembly 30; the thermally conductive pad 60 connects to the back plate 10, the Mini LED lamp panel 40 connects to the thermally conductive pad 60, and the optical assembly 30 connects to the middle frame 20 while contacting with the Mini LED lamp panel 40 directly.

Figure 1:
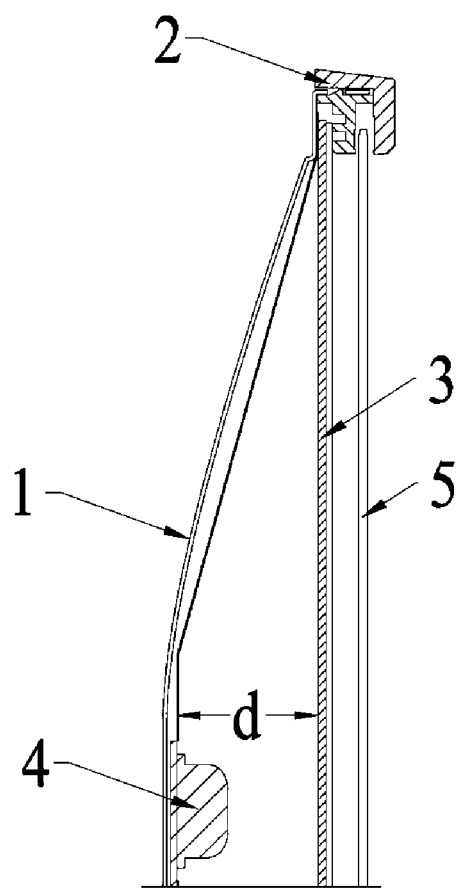
FIG. 1 illustrates a cross-sectional diagram of the direct-type backlight module in the prior art.

It shall be noted that, an OD value of a direct-type LCD TV in the prior art is generally greater than 8 mm, while a larger OD value means a greater thickness of a TV, thus an ordinary direct-type LCD TV is relatively thick. The present disclosure adopts a Mini LED lamp panel 40, the Mini LED lamp panel 40 may contact with the optical assembly 30 (specifically, a direct contact is adopted), needs no gap arranged (that is, the OD value is zero), a light emitted from the Mini LED lamp panel 40 may irradiate the optical assembly 30 evenly, thus making a thickness of the direct-type backlight module get greatly reduced. At a same time, comparing to a groove-type back plate in the prior art (as shown in FIG. 1), the present disclosure adopts a flat plate as the back plate, which is thinner, thus also reduces a thickness of the direct-type backlight module. According to a definition in the present profession, a Mini LED is an LED slightly larger than a micro LED, wherein a chip size of the micro LED is less than 80 μm, while a chip size of the Mini LED is 80-300 μm. The Mini LED has a plurality of characteristics including a high brightness, a long service life, a low cost and a high contrast.

Further, heat generated by the Mini LED lamp panel 40 is transferred to the back plate 10 through the thermally conductive pad 60, which can sufficiently dissipate heat to prevent the Mini LED lamp panel 40 and the optical assembly 30 from overheating. The thermally conductive pad 60 may be made of a thermal conductive material including aluminum, copper or etc. A size of the cooling fin 60 thermally conductive pad 60 is as same as a size of the Mini LED lamp panel 40, which is convenient for a fully contact with the Mini LED lamp panel 40 and a dissipation of the heat in the Mini LED lamp panel 40.

Figure 5:
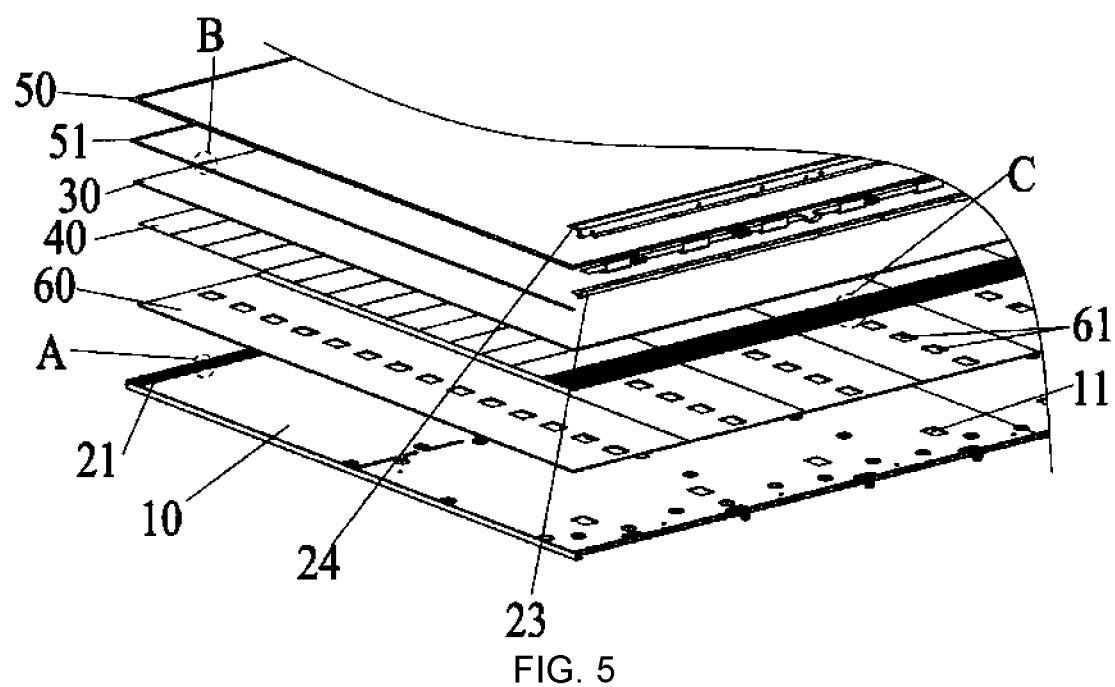
FIG. 5 illustrates a structural diagram on a front face of the direct-type backlight module in the present disclosure.
Figure 6:
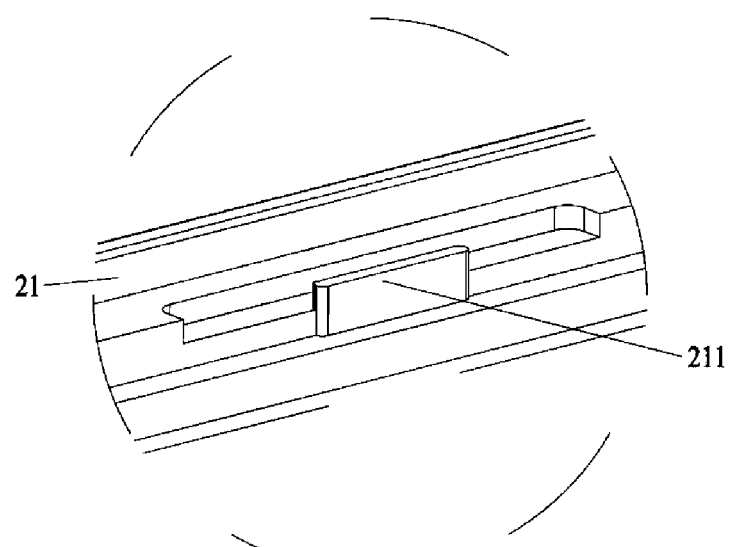
FIG. 6 illustrates an enlarged view of an area A in the FIG. 5.
Figure 7:
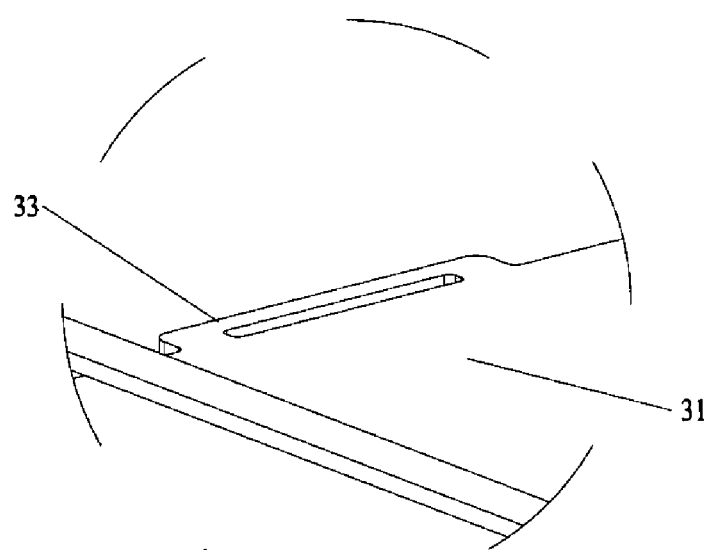
FIG. 7 illustrates an enlarged view of an area B in the FIG. 5.
Figure 8:
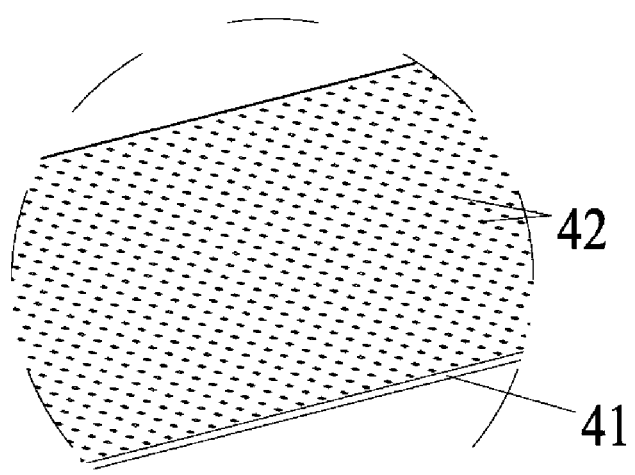
FIG. 8 illustrates an enlarged view of an area C in the FIG. 5.

In an embodiment of the present disclosure, referencing to FIG. 2, FIG. 5 and FIG. 8 at a same time, the Mini LED lamp panel 40 comprises: a mounting board 41 and a plurality of Mini LED lamps 42, the Mini LED lamps 42 are arranged in a matrix on a side of the mounting board 41 facing the optical assembly 30. A side of the mounting board 41 facing the thermally conductive pad 60 has a plurality of sockets 43 arranged, the thermally conductive pad 60 has a socket hole 61 arranged for the sockets 43 to pass through.

Specifically, the Mini LED lamps 42 are embedded in the mounting board 41. The Mini LED lamps 42 are usually only 80-300 μm, which almost fill up the mounting board 41, while each of the Mini LED lamps 42 is able to emit light independently, and emit light evenly on the optical assembly 30.

An amount of the Mini LED lamps 42 on the mounting board 41 is relatively large, thus all of the Mini LED lamps 42 are divided into a plurality of lamp areas, each lamp area has a same size and is arranged in a matrix, and each lamp area has a socket 43, the socket 43 is applied to connecting a plurality of wires, while the socket 43 is electronically connected with the Mini LED lamps 42 in a corresponding lamp area. The thermally conductive pad 60 connects to the back plate 10 by a double-sided adhesive tape. Specifically, the Mini LED lamps on the mounting board may be divided into 14 rows and 8 columns of array lamp area (shown as FIG. 2).

The thermally conductive pad 60 may be designed integrally or composed of a plurality of cooling components. In an embodiment, when the lamp areas are divided into 14 rows and 8 columns, it may arrange 8 cooling components, and each cooling component corresponds to a row of the lamp areas, thus each cooling component has 14 socket holes 61 arranged (shown as FIG. 5).

An embodiment of the present disclosure, shown as FIG. 3, wherein the mounting board 41 and the thermally conductive pad 60 are connected by a thermal conductive glue 62. Specifically, adopting thermal conductive glue 62 is beneficial to transfer the heat generated by the light board out through the thermally conductive pad 60.

A preferred embodiment of the present disclosure, referencing to FIG. 3-FIG. 7 at a same time, wherein a top surface of the optical assembly 30 has a plurality of hanging parts 33 arranged, and the middle frame 20 has a plurality of tabs 211 adapting to the hanging parts 33 arranged. The optical assembly 30 comprises a diffuser plate 32 and an optical film 31; the diffuser plate 32 is in direct contact with the Mini LED lamp panel 40, and the optical film 31 connects to the hanging parts 33.

Specifically, the middle frame 20 comprises: an upper middle frame 21, a lower middle frame 22, a left middle frame, a right middle frame, a rear pressing plate 23 and a front pressing plate 24. A top surface of the optical film 31 is hung on a tab 211 of the upper middle frame 21 through the hanging parts 33, and a bottom edge of the optical film 31 is fixed between the lower middle frame and the rear pressing plate 23 through the rear pressing plate 23, to ensure the optical film 31 sticks closely to the Mini LED lamp panel 40.

The middle frame 20 has an LCD screen arranged on, the LCD screen locates on a side of the optical assembly 30 away from the back plate 10. Specifically, a top edge, a left edge, and a right edge of the LCD screen are connected to the upper middle frame 21, the left middle frame, and the right middle frame through a double-sided adhesive tape respectively. And by a front pressing plate 24, a bottom edge of the LCD screen is fixed between the rear pressing plate 23 and the front pressing plate 24, to ensure the LCD screen fixed.

Figure 4:
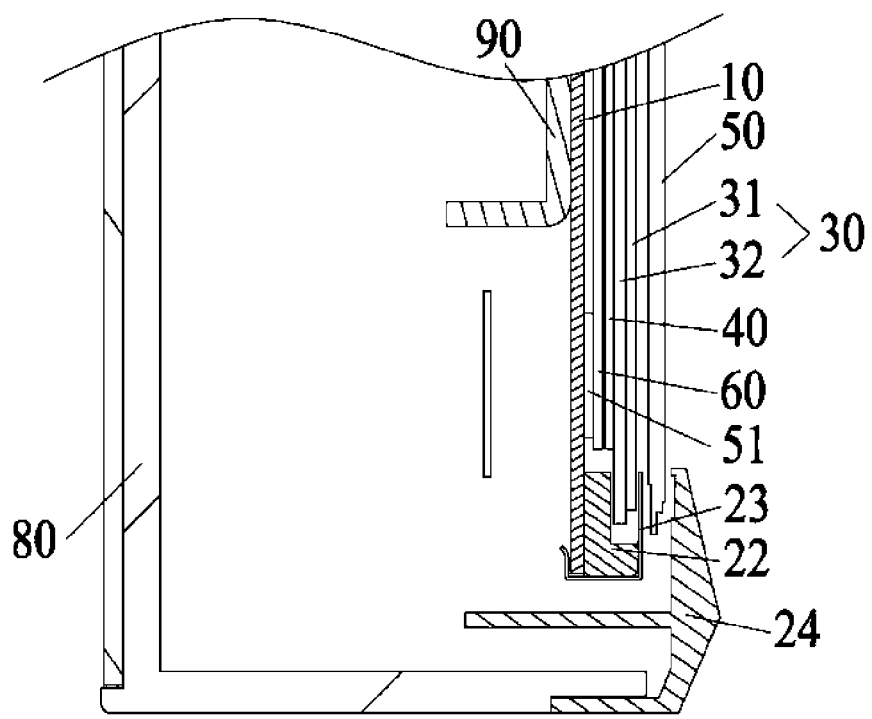
FIG. 4 illustrates a second cross-sectional diagram of the direct-type backlight module in the present disclosure.
Figure 9:
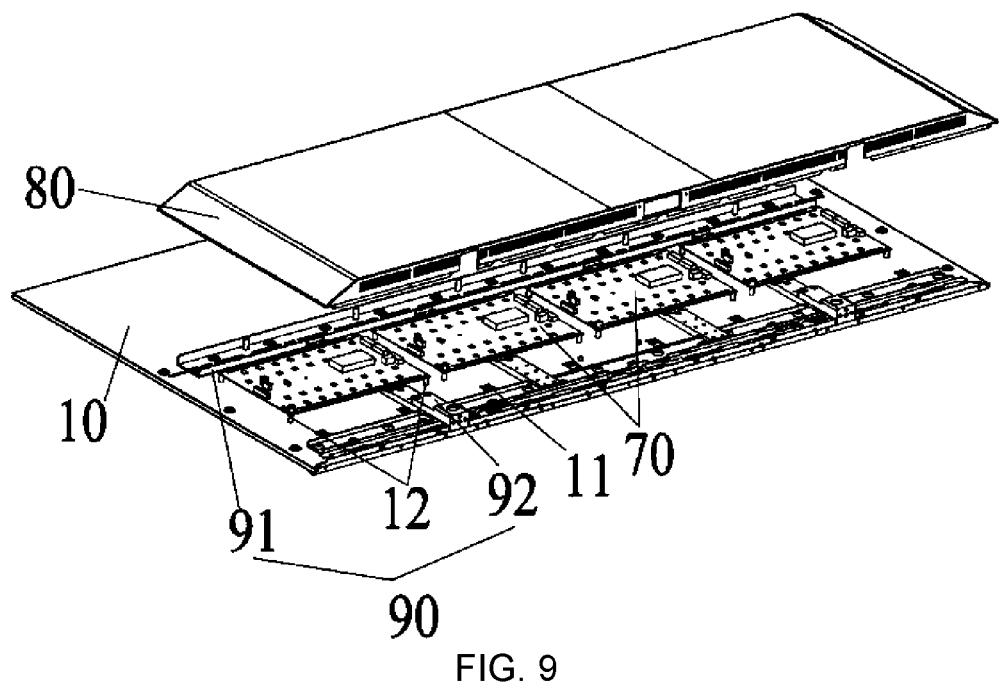
FIG. 9 illustrates a structural diagram on a back surface of the direct-type backlight module in the present disclosure.

An embodiment of the present disclosure, referencing FIG. 2, FIG. 4 and FIG. 9 at a same time, wherein a back of the back plate 10 has a plurality of core modules 70, a back shell 80 and a reinforcement beam 90 arranged, the core modules 70 and the reinforcement beam 90 locate in the back shell 80. Specifically, the core modules 70, the back shell 80 and the reinforcement beam 90 are locating at a back bottom of the back plate 10 (close to a ground), thus a back top of the back plate 10 (close to a sky) has an ultra-thin design. The core modules 70 connect to the Mini LED lamps 42 electronically through the sockets 43, the back plate 10 has a wiring hole 11 arranged, and a plurality of wires connecting to the core modules 70 may pass through the wiring hole 11 and the socket hole 61 before connecting to the sockets 43, thereby a conduction between the core modules 70 and the Mini LED lamps 42 is realized.

More specifically, there may be a plurality of the core modules 70, in an embodiment, when there are 8 cooling components arranged, the core modules 70 may be arranged as four, each core modules 70 is corresponding to two cooling components, and connects electronically to the Mini LED lamp 42 corresponding to the two cooling components. The back plate 10 has a plurality of pillars 12 arranged, each of the pillars 12 has an internal thread arranged, four corners of each of the core modules 70 have a plurality of screw through holes arranged, a plurality of screws may pass through the screw through holes and fix the core modules 70 to the pillars 12. The pillars 12 separate the core modules 70 from the back plate 10, to prevent heat on the back plate 10 from being transferred to the core modules 70 and causing the core modules 70 malfunction due to getting overheat.

The reinforcement beam 90 is applied to strengthening strength of the back plate 10 and preventing the back plate 10 from being deformed. The reinforcement beam 90 comprises two cross beams 91 located on both sides of the core modules 70 and a plurality of longitudinal beams 92 connecting the two cross beams 91. The longitudinal beams 92 are located between the core modules 70 and the back plate 10, since there is a gap between the core modules 70 and the back plate 10 due to the pillars 12, the longitudinal beams 92 may pass through the gap. Both the cross beams 91 and the longitudinal beams 92 are in contact with the back plate 10, which may achieve a better strengthening effect. Two cross beams 91 and the plurality of longitudinal beams 92 form a staircase shape. A bottom of the back shell 80 has a plurality of heat dissipation holes arranged for heat dissipation.

The present disclosure further provides a display, comprising the direct-type backlight module described in any one of the embodiments stated above, which is specifically as described above.

The present disclosure provides a display, since having arranged the direct-type backlight module described in any one of the technical solutions stated above, thus having all the benefits stated above, and no more details are stated herein.

All above, the present disclosure provides a direct-type backlight module and a display, the direct-type backlight module comprising: a back plate, an optical assembly, and a middle frame arranged on a front face of the back plate and located at a periphery of the optical assembly, wherein further comprising: a thermally conductive pad and a Mini LED lamp panel arranged between the back plate and the optical assembly; the thermally conductive pad connects to the back plate, the Mini LED lamp panel connects to the thermally conductive pad, and the optical assembly connects to the middle frame while contacting with the Mini LED lamp panel. Due to adopting the Mini LED lamp panel, the Mini LED lamp panel may contact with the optical assembly, having an OD value of zero, the light emitted by the Mini LED lamp panel may irradiate evenly on the optical assembly, making a thickness of the direct-type backlight module get greatly reduced.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:
1. A direct-type backlight module, comprising a back plate, an optical assembly, and a middle frame arranged on a front face of the back plate and located at a periphery of the optical assembly, wherein further comprising: a thermally conductive pad and a Mini LED lamp panel arranged between the back plate and the optical assembly; the thermally conductive pad connects to the back plate, the Mini LED lamp panel connects to the thermally conductive pad, and the optical assembly connects to the middle frame while contacting with the Mini LED lamp panel to reduce a thickness of the direct-type backlight module; and
    a plurality of core modules disposed at a back of the back plate, wherein the back plate has a plurality of pillars arranged, and the pillars separate the core modules from the back plate;
    wherein a bottom of a back surface of the back plate has a reinforcement beam arranged, the reinforcement beam comprises two cross beams and a plurality of longitudinal beams connecting to the two cross beams, and the cross beams and the longitudinal beams are in contact with the back plate to strengthen strength of the back plate; and wherein a top surface of the optical assembly has a plurality of hanging parts arranged, and the middle frame has a plurality of tabs adapting to the hanging parts arranged; and the middle frame comprises: an upper middle frame, a lower middle frame, a rear pressing plate, and a front pressing plate, a top surface of an optical film of the optical assembly is hung on one of the tabs on the upper middle frame through one of the hanging parts, and a bottom edge of the optical film is fixed between the lower middle frame and the rear pressing plate through the rear pressing plate to ensure the optical film sticks closely to the Mini LED lamp panel.

2. The direct-type backlight module according to claim 1, wherein the Mini LED lamp panel comprising: a mounting board and a plurality of Mini LED lamps; the Mini LED lamps are arranged in a matrix on a side of the mounting board facing the optical assembly.

3. The direct-type backlight module according to claim 2, wherein a side of the mounting board facing the thermally conductive pad has a plurality of sockets arranged, the thermally conductive pad has a socket hole arranged for the sockets to pass through.

4. The direct-type backlight module according to claim 2, wherein the mounting board and the thermally conductive pad are connected by a thermal conductive glue.

5. The direct-type backlight module according to claim 1, wherein the optical assembly comprises a diffuser plate and Drill the optical film; the diffuser plate is in direct contact with the Mini LED lamp panel, and the optical film connects to the hanging parts.

6. A display, wherein comprising a direct-type backlight module and an LCD screen, the direct-type backlight module comprises a back plate, an optical assembly, and a middle frame arranged on a front face of the back plate and located at a periphery of the optical assembly, wherein further comprising: a thermally conductive pad and a Mini LED lamp panel arranged between the back plate and the optical assembly; the thermally conductive pad connects to the back plate, the Mini LED lamp panel connects to the thermally conductive pad, and the optical assembly connects to the middle frame as well as contacting the Mini LED lamp panel to reduce a thickness of the direct-type backlight module; and a plurality of core modules disposed at a back of the back plate, wherein the back plate has a plurality of pillars arranged, and the pillars separate the core modules from the back plate;

wherein a bottom of a back surface of the back plate has a reinforcement beam arranged, the reinforcement beam comprises two cross beams and a plurality of longitudinal beams connecting to the two cross beams, and the cross beams and the longitudinal beams are in contact with the back plate to strengthen strength of the back plate; and wherein a top surface of the optical assembly has a plurality of hanging parts arranged, and the middle frame has a plurality of tabs adapting to the hanging parts arranged; and the middle frame comprises: an upper middle frame, a lower middle frame, a rear pressing plate, and a front pressing plate, a top surface of an optical film of the optical assembly is hung on one of the tabs on the upper middle frame through one of the hanging parts, and a bottom edge of the optical film is fixed between the lower middle frame and the rear pressing plate through the rear pressing plate to ensure the optical film sticks closely to the Mini LED lamp panel.

7. The display according to claim 6, wherein the Mini LED lamp panel comprising: a mounting board and a plurality of Mini LED lamps; the Mini LED lamps are arranged in a matrix on a side of the mounting board facing the optical assembly.

8. The display according to claim 7, wherein the mounting board and the thermally conductive pad are connected by a thermal conductive glue.

9. The display according to claim 7, wherein a side of the mounting board facing the thermally conductive pad has a plurality of sockets arranged, the thermally conductive pad has a socket hole for the sockets to pass through.

10. The display according to claim 6, wherein the optical assembly comprises a diffuser plate and the optical film; the diffuser plate is in direct contact with the Mini LED lamp panel, and the optical film connects to the hanging parts.

11. The display according to claim 6, wherein the back of the back plate has a back shell arranged, and the core modules locate inside the back shell.

12. The display according to claim 6, wherein the core modules connect electronically to the Mini LED lamps through the sockets; the back plate has a wiring hole arranged, and a plurality of wires connecting to the core modules may pass through the wiring hole and the socket hole in turn and connect to the sockets.

13. The display according to claim 6, wherein the middle frame further has the LCD screen arranged on, and the LCD screen locates on a side of the optical assembly away from the back plate.

14. The display according to claim 13, wherein the middle frame comprises: a left middle frame and a right middle frame.

15. The display according to claim 14, wherein a top edge, a left edge, and a right edge of the LCD screen are connected to the upper middle frame, the left middle frame, and the right middle frame respectively.

16. The display according to claim 14, wherein a bottom edge of the LCD screen is fixed between the rear pressing plate and the front pressing plate.

\* \* \* \* \*